Sept. 21, 1937.　　　　B. C. PLACE　　　　2,093,734
SECURING TRIM PANEL
Original Filed June 25, 1936　　2 Sheets-Sheet 1
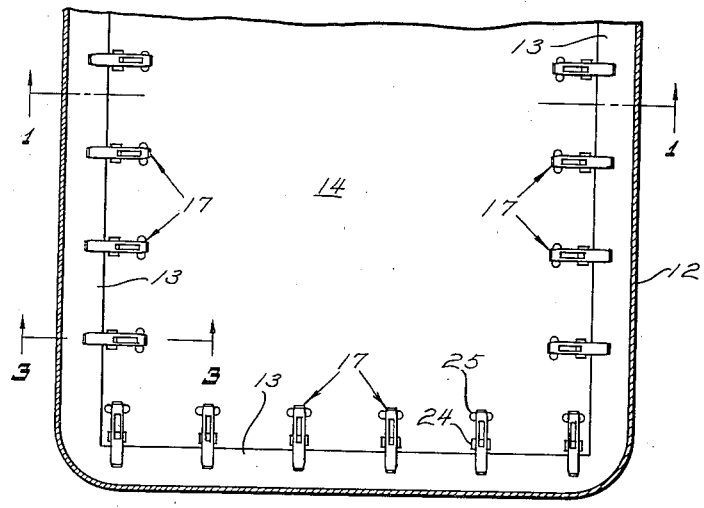
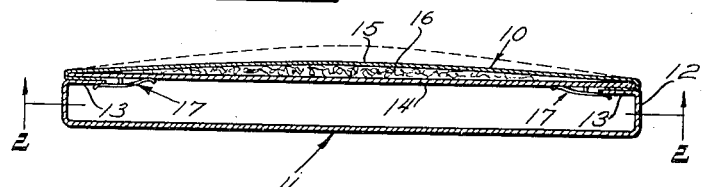
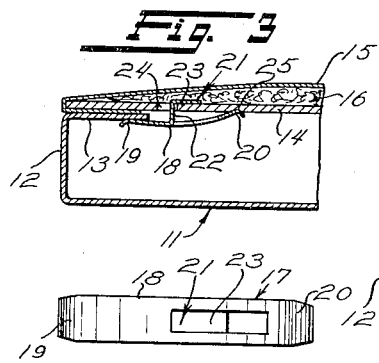
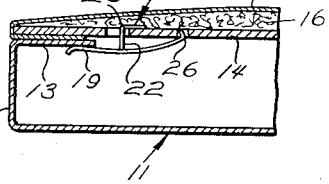
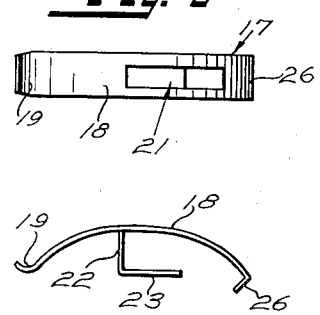
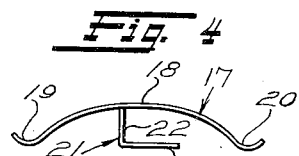
Inventor
Bion C. Place
By Strauch & Hoffman
Attorneys Sept. 21, 1937.　　　　B. C. PLACE　　　　2,093,734
SECURING TRIM PANEL
Original Filed June 25, 1936　　2 Sheets-Sheet 2
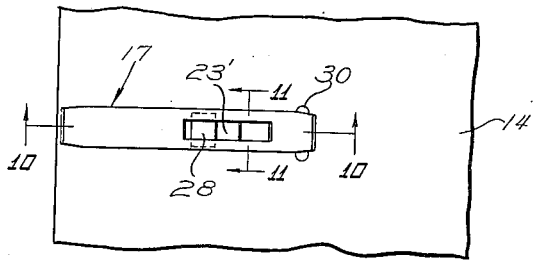
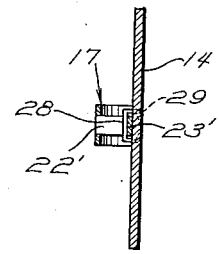
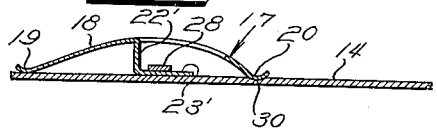
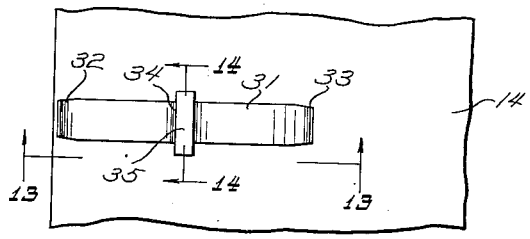
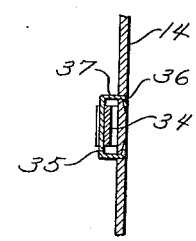
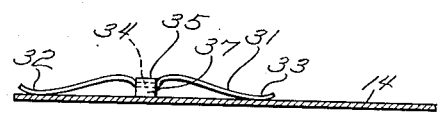
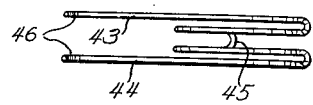
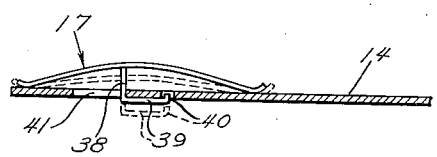
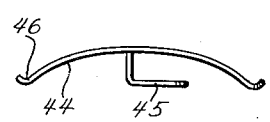
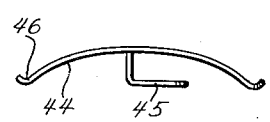
Inventor
Bion C. Place
By Strauch & Hoffman
Attorneys Patented Sept. 21, 1937

2,093,734

UNITED STATES PATENT OFFICE 2,093,734

SECURING TRIM PANEL

Bion C. Place, Detroit, Mich., assignor of one-half to George E. Gagnier, Detroit, Mich.

Original application June 25, 1936, Serial No. 87,291. Divided and this application October 14, 1936, Serial No. 105,597

2 Claims. (Cl. 24—259)

This invention relates to novel fasteners for securing trim panels, such as automobile door panels, for example, to supporting frames. More particularly, the invention is concerned with types of spring fasteners that secure the panel to the frame by providing resilient tongue-like clamping elements that bear against the rear of the frame and serve to yieldingly hold the panel against the frame, rather than pass through openings in the frame that function as sockets for the reception of the shanks of the fasteners.

The primary purpose of the present invention is to provide a simple and inexpensive spring fastener, of the type that bears against the rear of the frame, rather than penetrates it, which fastener may be applied or interlocked to the panel with great facility, after the latter has been completely constructed.

Another object of the invention is to provide a spring fastener shaped so that its inherent resilience is utilized to retain it in assembled relation to the panel during application of the latter to the frame and further utilized to exert a pull on the panel effective to retain the latter in snug engagement with the frame.

A still further object of the invention is to provide a spring fastener of elongated upwardly curved form having a unitary hook formed for convenient engagement with the foundation of the panel after the latter has been completely constructed by flattening the curvature of the fastener.

This invention also aims to provide an elongated spring fastener in the form of an elongated strip, which has one end formed for ready engagement with a frame, a part providing a shoulder to prevent longitudinal movement of the fastener, and a hook-like projection to interlock the fastener to the panel through a recess therein.

This application is a division of application Serial Number 87,291, filed June 25, 1936.

Further objects of the invention will appear as a description thereof proceeds with reference to the accompanying drawings in which:

Figure 1 is a transverse section of a frame, such as an automobile door frame, having a trim panel applied thereto, by means of fasteners of the present invention, the section being taken on the plane indicated by line 1—1 of Figure 2.

Figure 2 is a vertical section taken on the plane indicated by the line 2—2 in Figure 1, looking in the direction of the arrows.

Figure 3 is an enlarged fragmentary sectional view taken on the plane indicated by line 3—3 in Figure 2, looking in the direction of the arrows.

Figures 4 and 5 are respectively plan and side elevational views of the fastener utilized in the combination illustrated in Figures 1, 2 and 3.

Figures 6 and 7 are respectively plan and side elevational views of the modified form of fastener.

Figure 8 is a fragmental sectional view as seen in Figure 3, but showing the mode of use of the modified form of fastener of Figures 6 and 7.

Figure 9 is a fragmentary view showing a part of a trim panel having a further modified form of fastener applied thereto.

Figures 10 and 11 are sectional views taken on the planes indicated by the line 10—10 and 11—11 in Figure 9, the sections being taken upon looking in the direction of the arrows.

Figure 12 is a fragmentary view showing a foundation having a still further modified form of fastener applied thereto.

Figures 13 and 14 are respectively sections taken on the lines 13—13 and 14—14 in Figure 12.

Figure 15 is a sectional view of a fragment of a panel showing a still further modified form of fastener applied thereto.

Figures 16 and 17 are respectively plan and side views of a fastener constructed from a single piece of wire rather than from a band of sheet metal.

Like reference characters indicate like parts throughout the several figures.

The fastener of the present invention is particularly designed to attach trim panels, such as panel 10, to a supporting frame, such as the frame 11 of the door of an automobile, the trim panel serving to upholster the inside of the door. The frame 11 is provided with inturned flanges 12 disposed approximately normal to the plane of the outside of the door and further flanges 13 disposed in approximate parallelism with the outside plane of the door. The fasteners of this invention are designed to engage the flanges 13 of the door frame and clamp said flanges between the inside of the panel and tongues formed by the ends of the fasteners adjacent the margins of the panel.

Trim panel 10 comprises a foundation 14 constructed of fibre board or the like, a fabric cover 15 of suitable finish material, which cover is lapped around the edges of the foundation as is customary. Wadding 16 may be disposed between the foundation 14 and the fabric covering 15. Automobile trim panels are frequently constructed as just briefly described.

The fasteners designated as a whole by 17 in Figures 1 and 2 are elongated in form and are secured to the foundation in a manner presently to be described after the trim panel has been completely constructed. The fasteners are secured to the foundation in such a manner as to leave the end of each fastener adjacent the margin of the panel free of attachment to the panel so that said end of the fastener, which is constructed of spring material, may be bent away from the foundation in opposition to the inherent resilience of the material from which the fastener is constructed. When the ends of the fasteners are bent away from the foundation, the flanges 13 of the door frame may be brought between said ends and the foundation or panel.

In applying the panel to the door frame, the fasteners at the right hand side, for example, of the panel, are first engaged behind the flange 13, the panel being bodily shifted vertically away from the lower flange 13 so that the fasteners 17 at the bottom of the panel will clear said flange. After the fasteners have been engaged with the flange 13 at the right side of the panel, the body of the panel is flexed into the dotted line position illustrated in Figure 1 so that the free ends of the fasteners at the left hand side of the panel may be forced in back of the flange 13 at the left hand side of the door frame. The panel is then permitted to assume its original flat condition. Engagement of the fasteners at the bottom of the panel with the lower flange 13, viewed in Figure 2, is then brought about by sliding the panel bodily downwardly to bring the free ends of the fastener 17 at the bottom of the panel into engagement with the rear of the flange 13 at the bottom of the door frame. The panel is secured in final position by attaching a molding or garnish strip at the top of the panel (not shown) which will prevent movement of the panel in any direction and maintain it in fixed position on the frame of the door.

All of the fasteners presently to be described are adapted for use in securing trim panels to frames in the manner just described. It will be understood that the flanges 13 of the door frame need not be perforated for the reception of shanks of spring fasteners, now widely used in securing trim panels to automobile or similar frames. Problems of alignment of the fasteners with openings in the flanges are accordingly not presented when fasteners such as presently to be described are used, inasmuch as the spring tongues formed by the fasteners may engage the flange 13 at any point along the length thereof.

Now referring to the preferred form of fastener, and its mode of attachment to the foundation 14, illustrated in Figures 3, 4 and 5, it will be observed that the fastener includes an elongated sheet metal body 18, the ends 19 and 20 of which are curved upwardly. The main portion of the body 19 is bowed upwardly as clearly seen in Figure 5. The upwardly bowed portion carries a tongue 21 separated from the body of the fastener by slits or cuts, the tongue 21 comprising a downwardly extending portion 22 and a portion 23 disposed approximately at right angles to the portion 22 as clearly shown in Figure 5. The portions 22 and 23 form, in effect, a hook by which the fastener is engaged upon the foundation after one side of the foundation has been covered.

In order that the fastener may be engaged with the foundation, the latter is provided with an opening 24 at every point at which a fastener is to be attached thereto. Disposed adjacent each opening 24 is a recess 25, preferably formed by indenting the foundation without penetrating the same. The fastener of Figures 4 and 5 is associated with the foundation by bringing the portion 23 opposite the opening 24, and then applying pressure in a direction to flatten the upwardly bowed portion of the body of the fastener, said body flattened until the hook formed by the portions 22 and 23 of the fastener is in a position to engage the inside of the foundation when the fastener is moved to the right, viewing Figure 3, until complete engagement of the hook is effected. In the final position of the fastener, the round end formed by the upturned portion 20 engages in the notch 25, said engagement preventing shifting of the fastener during application of the panel to the frame of the door by preventing longitudinal movement of the fastener in a direction necessary to disengage the hook formed by the portion 23 from the foundation. Fasteners are applied along the three margins of the foundation in the manner just stated, and the panel is then applied to the door frame in accordance with the mode of procedure already described.

It will be observed that a firm interlock is provided between the fastener and the foundation inasmuch as when the hook is engaged with the foundation, the fastener is flattened from its normal position so that the body of the fastener exerts a pull on the hook maintaining it in firm frictional engagement with the inside of the foundation. At the same time the flattening of the upwardly bowed portion of the fastener serves to cause the free end 21 to very firmly bear upon the inside of the panel, and when the end 19 is separated from the foundation in forcing the flange 13 between the tongue formed by the end 19 and the foundation, such separation causes a further flattening of the body and an increase in the tension set up in the spring of the body. As a result when the fasteners are engaged in back of the flange 23, they serve to hold the panel very firmly against the flange 13 and prevent movement of the panel with respect to the frame in any direction, inasmuch as the tension under which the fastener is placed serves to exert a force on the panel tending to draw it against the supporting frame. The panel is thus caused to lie flat against the frame regardless of slight irregularities in the panel or in the frame.

In the form of the invention illustrated in Figures 6, 7 and 8, a fastener is disclosed in which the end thereof remote from the margin of the panel is provided with an inwardly turned portion 26 instead of the rounded upwardly turned end 20 characterizing the fastener of Figures 4 and 5. In the use of this fastener the foundation is provided with an opening 27 in transverse alignment with the opening 24 within which the hook 26 may engage, the opening 27 being used instead of the recess 25 in the form of the invention illustrated in Figure 3. The fastener of this form of the invention presents a more positive engagement between the foundation preventing movement of the fastener in a direction necessary to disengage the hook, once it has been engaged with the foundation. In other respects the fastener of Figures 6 and 7 is like that of Figures 4 and 5.

In Figures 9, 10 and 11, a modified way of attaching or interlocking the fastener to the foundation is disclosed. In this form of the invention, the foundation is unperforated, that is, no openings passing completely therethrough are formed therein. The fastener is attached by attaching to the foundation, at the points at which the fasteners are to be engaged therewith, staples 28 each having legs 29 which are driven through the foundation and preferably clinched on the inside thereof. The portion of the staple that connects the ends 29 is maintained in spaced relation to the outside of the foundation. Recesses 30, preferably formed by indenting the foundation opposite the staples, are also provided. The recesses 30 do not pass completely through the foundation as illustrated in Figure 10. In this form of the invention, the portion 22' corresponding to the portion 22 of the fastener before described is made shorter and the fastener engaged with the foundation by passing the portion 23' between the staple and the outside of the foundation. The fastener is moved in a direction normal to the margin of the panel until the end 20 engages in the recess 30, which prevents movement of the fastener in a direction to disengage the portion 23' from beneath the staple 28. In this form of invention, as in the previous forms, the bowed portion of the fastener is pressed downwardly in order to bring the portion 23' beneath the staple so that the body of the fastener is under tension when it is applied to the panel.

Another form of the invention is illustrated in Figures 12, 13 and 14 and comprises a sheet metal fastener having an elongated body 31 and upwardly turned ends 32 and 33. The body 31 is upwardly bowed, the mid-portion of said upwardly bowed portion being offset downwardly as shown by 34. The fastener of this form of the invention may be applied to the foundation by first applying to the foundation staples 35 having legs 36 and 37 that penetrate the foundation and preferably are clinched against the inside thereof, the body of the staple 35 being maintained substantially spaced from the outside of the foundation 14. The foundation is interlocked with the foundation 14 by passing it from one end under the body of the staple 35 until the offset portion 34 is opposite the staple. The pressure applied to flatten the fastener in passing it beneath the staple is then released and the body of the staple is seated in a transverse groove in the body of the fastener provided by the offset 34. In this manner the fastener is firmly interlocked to the panel and is incapable of becoming detached during the application of the panel to the frame in the manner already described.

A still further modification of the invention is illustrated in Figure 15 in which a fastener having a body of the form already described is provided with a depending portion 38 having a portion 39 disposed at right angles thereto and forming therewith a hook and an upwardly turned portion 40 at the end of the hook of the portion 39. In applying the fastener just described to the foundation 14, the latter is provided with openings 41 and 42, the portion 40 being brought into the opening 42 by bending the fastener into the dotted line position illustrated in Figure 15 and then permitting it to resume its normally bowed condition sufficient to cause the portion 39 to bear firmly against the under side of the foundation. In this position the portion 40 is disposed in opening 42 preventing movement of the fastener with respect to the panel.

Still another modified form of fastener is shown in Figures 16 and 17, such form differing from that already described only in that the fastener is constructed of wire rather than sheet metal. The wire fastener comprises an upwardly bowed body consisting of the two ends of the piece of wire, said ends 43 and 44 being each bent into bowed form. The mid-portion of the wire is bent inwardly between the ends 43 and 44 and into the form of a hook 45 corresponding in structure and function to the hook formed by portions 22 and 23 of the form of the invention first described. The fastener of Figures 16 and 17 is bent into the desired form and the wire is then tempered to provide it with the desired resilience. The tips of the two ends 43 and 44 are preferably curved upwardly at 46 for convenient engagement with flange 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A spring fastener for securing a trim panel or the like against one side of a metal flange, comprising an elongated strip of resilient sheet metal having a substantial part of its length bowed upwardly and having one end turned up to facilitate wedging of said flange between said end and the trim panel, the other end of said strip having a portion disposed angularly to the length of the strip to provide a shoulder for engagement with the wall of a recess in said panel parallel to the edge of said flange to resist shifting of said strip in a longitudinal direction, and a hook-like tongue carried by the bowed portion of said strip and lying beneath said portion in spaced relation thereto to underlap the panel under a yielding pull exerted by said bowed portion and thus hold the strip from movement away from the panel when said flange is wedged between said first named end and the panel.

2. A spring fastener for a trim panel comprising an elongated resilient strip of sheet metal having one end turned upwardly to engage a frame member, said strip being bowed upwardly through a part of its length and having an L-shaped portion depending from said bowed part and formed to be passed through a recess in said panel and yieldingly underlap a part of said panel when said bowed portion of the strip is flattened, and an angular portion adjacent the other end of the strip to prevent longitudinal shifting of said strip.

BION C. PLACE.